Feb. 23, 1937. D. TEATINI 2,071,776
PURIFICATION OF SUGAR FACTORY AND REFINERY JUICES
Filed April 20, 1934
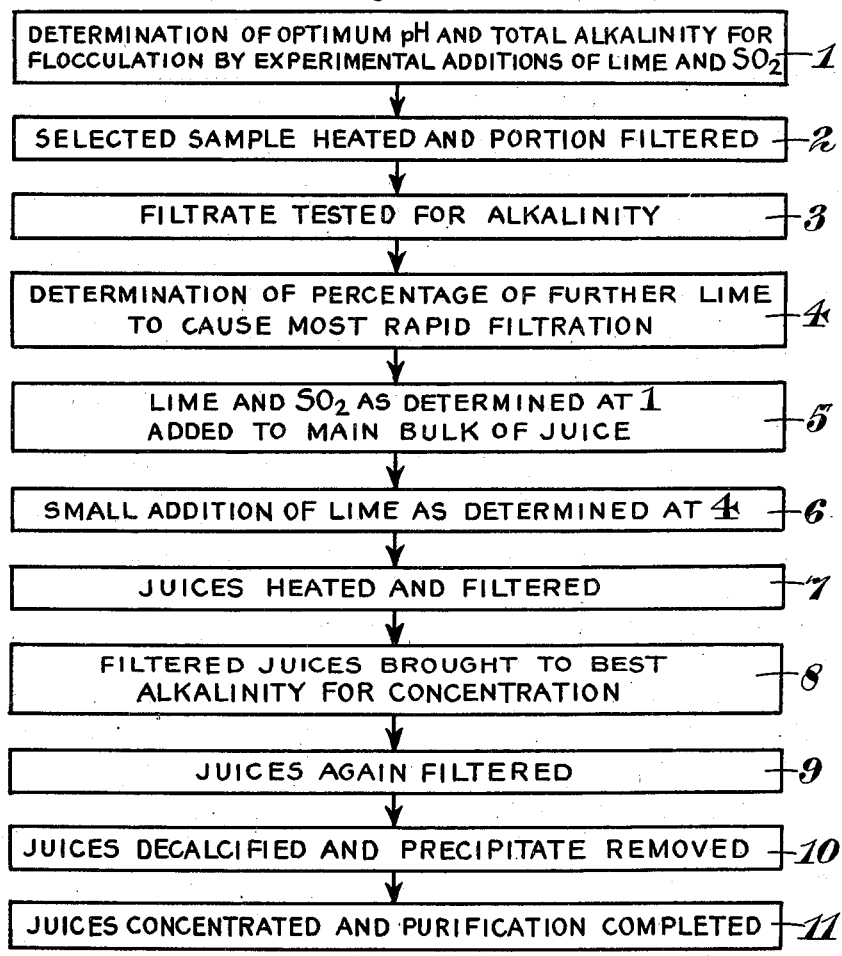
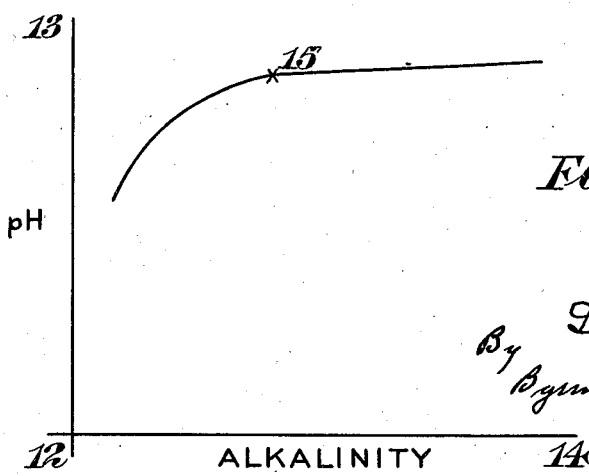

Patented Feb. 23, 1937

2,071,776

UNITED STATES PATENT OFFICE 2,071,776

PURIFICATION OF SUGAR FACTORY AND REFINERY JUICES

Dario Teatini, Hougaerde, Belgium

Application April 20, 1934, Serial No. 721,588
In Belgium May 1, 1933

8 Claims. (Cl. 127—50)

This invention relates to processes for the purification of sugar juices, particularly factory and refinery juices, and has particular reference to the removal from such juices of impurities which exist therein in the colloidal state, i. e., impurities which normally pass through filters and consequently cannot, without change, be removed by the normal processes of filtration. Particularly, also, it relates to improvements in processes of the character described in my Patent No. 1,988,923.

Briefly, by the methods described in my said patent, the flocculation of colloidal impurities in sugar juices, and the stabilization and settling of the flocs, is effected, among other results, with a considerable economy in the expenditure of alkali. By the present invention a further economy of lime or other alkali, and other materials, such as carbon dioxide, is effected, particularly in obtaining the most favorable condition of the juice for the separation of the impurities therefrom by filtering or otherwise, and other beneficial results in processes of the character of those described in my said patent are achieved. Objects of the invention, accordingly, comprise the provision of improved methods and steps thereof in the purification of sugar juices, with a view to enhanced economy and effectiveness in operation.

In order that the invention may be more clearly understood, attention is directed to the accompanying drawing, in which Fig. 1 is a diagrammatic representation of the steps of a purification process comprised within the invention, and Fig. 2 is a diagram indicating typical relationships between pH values and total alkalinity during the liming of beet sugar juice.

As stated in said patent, methods chiefly in use theretofore for the removal of impurities from sugar juice in beet or cane sugar manufacture comprise the well known carbonatation and sulphitation processes, in both of which the juice is defecated with lime, excess of which is later neutralized by carbonic acid in the first named process and by sulphur dioxide in the second. These, and similar processes, have required the use of considerable quantities of lime in excess of those necessary for achieving the purely chemical reactions of the defecation process. For this, involving the neutralization of the acidity of the juice, production of organic lime salts, etc., a comparatively small percentage of lime is needed, probably less than 0.5 per cent CaO. It was, however, generally believed that high alkalinity was required for good juice purification, and lime up to at least 2% or even 3.5% on the amount of the juice was commonly used in the first liming, with further amounts of lime added in some cases in the later steps of the process. The percentages of lime used were largely determined by the requirements for good filtration of the juices when carbonated, requirements in regard to the press cakes formed by the carbonates, and of the colour of the juice obtained after filtration. All of these requirements occasioned the use of considerable amounts of lime.

In my said patent a process is described in which a considerable saving is effected, inter alia, in the amounts of lime and other materials used in the purification of sugar juices. That process, briefly, took advantage of the fact that individual colloids constituting part of the impurities of the raw sugar juice have well defined iso-electric points at which, under suitable conditions of temperature and alkalinity, flocculation of the colloids will take place quite readily. It was impossible commercially to flocculate each individual colloid in the juice at its individual iso-electric point, but a discovery was made, that a point of pH value and alkalinity could be determined, for the juice, at which, at suitable temperature, a maximum quantity of the colloidal impurities would be flocculated, and this flocculation, under suitable treatment, would be irreversible. This point was therein, and will herein, be termed "the optimum iso-electric point".

In the process described in said patent alkali was added to the sugar juices in regulated amount to bring the pH value of the mixture to that of the optimum iso-electric point of the constituents to be flocculated, this being within the alkaline range, and to render the juice alkaline to an extent which is slightly in excess of the minimum requirement of alkali to attain such pH. Sulphur dioxide or equivalent was then introduced, in liquid form or as gas under pressure in comparatively small quantity, insufficient to reduce the pH value of the fluid medium substantially below that of said point. This resulted, with a comparatively small expenditure of lime and $SO_2$, or equivalents, in a quite complete and irreversible flocculation of the colloidal impurities in the juice. In one example of a process according to that invention beet sugar juice was treated with lime necessary to neutralize the acidity of the juice (0.05 to 0.1% in that case) plus that necessary to attain the optimum pH, this pH being approximately 10.5 to 11, and the additional lime about 0.20%. The requisite amount of liquid sulphur dioxide was then run in.

In the practical application of the process described the custom has been to defecate the juice, after the flocculation of the colloids, by the addition of 0.4 to 1 grm. of lime per 100 cc. of juice, this addition of lime being followed by the normal processes of carbonatation, filtration and concentration. Such addition of lime was thought necessary, in accordance with general experience and prior practice, in order to obtain, after subsequent carbonatation a filtering medium which would filter well and economically, and to prevent high sugar loss in scums, or difficulty and expense in recovering sugar from the scums. Filtration could not, in most cases, be achieved at the point of pH value and alkalinity at which, in accordance with my said invention, the flocs form, and are stabilized, and settle, without producing an uneconomic poor filtration, sugar loss, etc.

Further I have found that in certain cases the colloidal impurities in sugar juices are completely flocculable by lime, so that in such cases the use of sulphur dioxide, following the use of lime, is not required. It appears, as is stated in my said patent, that certain colloids in the juice carry electrical charges which are neutralized by the charges carried by the ions dissociated from the lime, but that in most cases not all of the colloids in the juice will be flocculated by this procedure, but may be by the subsequent treatment with the sulphur dioxide, it appearing that the second electrolyte, dissociating in the juice, provides ions which neutralize the charges on colloids which are not neutralized by the ions of the alkali electrolyte. In some cases, however, the juice may only contain colloids of the type the charges of which are neutralized by the ions dissociated from the alkali electrolyte, and in such cases the sulphur dioxide, or equivalent, may be omitted, in obtaining flocculation of the colloids.

In the practical application of the process just described, in which the sulphur dioxide is not used in causing flocculation, the custom has also been to defecate the juice after flocculation of the colloids, by the addition of a supplementary amount of lime, so that the total amount of lime added was, in the purification of beet sugar juice, between about 0.7% and about 1%, this being required, in order to obtain, after subsequent carbonatation, a good filtering medium, as explained above.

I have now found that considerable further economies in sugar purification can be effected by modifying the process described. This modification is based on my discovery that the degree of "soluble alkalinity" of the juice materially affects the ease with which flocculated colloids can be removed from the juice, and that this soluble alkalinity can be adjusted to an optimum point for the removal of such impurities, by the addition of an amount of lime or equivalent alkali which is quite small, relatively to the amount of lime added in the prior practice.

It will be seen that the removal of colloidal impurities from sugar juices presents two problems, first, the flocculation of the colloidal impurities in maximum amount and under such conditions that the floccules have but little or no tendency to revert to the colloidal state, and, second, the removal of the flocculated matter from the juices. These two problems are to some extent distinct in that the conditions under which the flocculation of the colloidal impurities takes place most readily may not be, and in general are not, the best conditions for the mechanical removal of the flocculated matter from the sugar juices by process of sedimentation, decantation, filtration, centrifuging, or the like.

Accordingly, in the complete process, there may be two determinations and adjustments, in one of which the optimum pH value of the juice and its total alkalinity percentage are arrived at, to enable flocculation as described, and in the other of which the optimum soluble alkalinity of the juice to enable ready separation of the flocculated matter is arrived at. It will be noted that I have found the optimum soluble alkalinity, for filtration, etc., to lie at substantially the pH which is optimum for flocculation, this enabling the conditions optimum for flocculation to be unaffected by adjustments of alkalinity for filtration. The addition of alkali which may be required to attain the optimum soluble alkalinity will never be enough to substantially alter the pH of the juice.

The process may, therefore, comprise the adding to the juice of lime or equivalent alkali, and if necessary sulphur dioxide or electrolytically equivalent substance, in amounts sufficient to bring the juices to the optimum isoelectric point, in the alkaline range, of the constituents to be flocculated, and the total alkalinity to a point slightly above that corresponding to the pH of said optimum isoelectric point; adjusting the soluble alkalinity, as by adding a small amount of lime or equivalent alkali, so that the soluble alkalinity of the juices is an optimum for the subsequent removal of the flocculated impurities from the liquid; heating the juices to the flocculating temperature, and, after separating the flocculated impurities, treating the juices with $SO_2$ or $CO_2$ or other acid until the alkalinity of the juices is reduced to factory requirements. It will be seen that this process, in which the filtration takes place immediately after the flocculation of the colloidal impurities and adjustment of the soluble alkalinity does not involve defecation of the juice by the further relatively considerable additions of lime or other alkali, followed by carbonatation, before a good filtering medium was obtained, as in the prior practice referred to. The scums produced by the new process contain a somewhat higher sugar percentage than those of the prior practice, but this element of disadvantage is neutralized by the fact that a much smaller quantity of such scums is produced. The final product, is of normal high grade.

In reference to the above, it is noted that "soluble alkalinity" means the percentage of lime or equivalent dissolved in the liquid and is determined by titration of the filtered solution, as will be explained hereafter. On the other hand "total alkalinity" means the percentage of both dissolved and suspended lime in the liquid, and is determined by titration of the unfiltered liquid. This latter is the alkalinity that is referred to in said prior patent, where it is stated that the optimum isoelectric point, at which flocculation will most readily occur, is found at a determined pH value in the alkaline range, with an alkalinity (total) slightly in excess of that corresponding to such pH value.

In further explanation of these distinctions it may be noted that pH value is a measure of the hydrogen ion concentration of the juice, i. e., a measure of the extent of dissociation of substances in solution. This bears no direct relation to the alkalinity or acidity of the juice as obtained by titration, which only indicates the ability of the solution to neutralize acid or alkali. For example, the alkalinity of limed sugar juice, as measured by the usual chemical tests, depends upon the total amount of dissolved and suspended lime therein, whereas the pH value increases only as the added lime dissociates. Further, as lime is added, the rate of dissociation decreases and a point is reached at which the pH value practically ceases to rise while additions of lime continue to increase the alkalinity so far as the lime is added.

The relationship between the pH value and the corresponding alkalinity in the case of sugar juice treated with lime may best be seen by reference to the accompanying drawing, Fig. 2, in which the ordinates 12, 13 of the graph represent pH values of the sugar juice and the abscissae 12, 14 represent the corresponding values of the alkalinity. It will be seen that the pH increases sharply with increase in alkalinity at the commencement of the graph and that beyond a particular point such as 15 the increase of pH with increase in alkalinity falls off to a marked extent. Thus, at and beyond the point 15 on the graph the addition of a further small amount of lime will produce an increase in pH relatively small compared with the increase in pH produced by a similar addition of lime at other points up to 15 on the graph.

The two adjustments referred to above of the pH value and total alkalinity of the juice, and also the soluble alkalinity, to obtain optimum conditions for flocculation and for removal of the flocculated matter, may be made by a single addition of lime or equivalent alkali, as will be explained hereafter.

For ready reference, and to facilitate understanding of the invention, attention is directed to Fig. 1 of the drawing, illustrating diagrammatically the various steps of a process, numbered from 1 to 11, comprising one form of the invention.

Certain definitions should now be given.

In this specification and claims the term "sulphur dioxide or electrolytically equivalent substance" means an acidic gas such as $SO_2$ or $CO_2$, an acid or an acidic substance which (a) is an electrolyte, (b) is very readily distributed in ionic form through the whole mass of the juice so that the ions act upon the unflocculated colloids, (c) under the conditions employed will not act as a chemical reagent (i. e. will not form salts with alkali) and (d) is capable of giving rise to a high instantaneous concentration of those ions ($SO_2$, $SO_3$, $SO_4$, $CO_2$, $CO_3$, $PO_3$, $P_2O_5$) which by virtue of their negative charge neutralize the positive charge carried by those colloids not already flocculated by the alkaline ions. It has been found that when a high instantaneous concentration of ions is present the ions tend to act electrolytically with the colloidal particles rather than react chemically with the lime to form insoluble compounds.

An example of certain materials which may be used to furnish the ions mentioned above, $SO_3$ ions may be formed by use of sulphur dioxide which under certain circumstances form a hydrated complex with water; $SO_4$ ions may be derived from dilute sulphuric acid; $CO_3$ ions are furnished by carbon dioxide by formation of one of its hydrated complexes with water and $P_2O_5$ ions may be derived from phosphorus pentoxide.

The expression "factory requirements" means that degree of alkalinity which the particular factory employs for the subsequent process of decolorization, clarification, evaporation and final crystallization and depends upon (a) the type of final product required (b) the design of the factory equipment, and (c) the judgment of the operator, and the expression "flocculating temperature" means that temperature at which the floccules are rendered stable and the colloids are dehydrated, and in general lies between 80° C. and 95° C. for beet sugar juice.

The expression "lime or equivalent alkali" comprises the corresponding oxides and hydroxides of the alkalies or alkaline earths, or the carbonates of the alkalis, or mixtures thereof.

By the expression "optimum isoelectric point" is meant those conditions of pH and alkalinity under which the total amount of colloidal impurities flocculated is a maximum i. e. the conditions under which a maximum amount of the colloidal impurities has been brought to their isoelectric points, or to the threshold thereof. Such conditions of pH and alkalinity may be determined for example by means of a simple series of tests such as is hereinafter described.

The pH value corresponding to the optimum isoelectric point in the alkaline range is in the case of raw beet juices substantially between the values 10.6 and 12.0 and in the case of raw cane juices will likewise lie in the alkaline range. When the sugar juices undergoing purification are beet sugar juices the amount of lime added may be between 0.15 and 0.35% on the weight of the juice.

The lime may be replaced, if desired, by an equivalent alkali e. g. sodium carbonate or caustic soda and the amount of such equivalent alkali will be that necessary to attain the pH characterizing the optimum isoelectric point.

In those cases where the colloidal impurities in the sugar juices are substantially completely flocculated by lime or equivalent alkali alone the addition of sulphur dioxide or electrolytically equivalent substance following the first addition of lime may, as stated above, be omitted altogether. When sulphur dioxide is used this may be introduced in the liquid form or as a gas under relatively high pressure in order to secure the high instantaneous concentration of ions mentioned above. Under these conditions rapid and irreversible flocculation of the colloidal impurities of the sugar juices is brought about.

It has been found, as stated above, that separation of the flocculated impurities of the juices is most readily effected when the alkalinity value of the filtered juice (i. e. the soluble alkalinity) is an optimum.

After the juice has been brought to the optimum isoelectric point in the alkaline range of the colloidal impurities (so that flocculation of the impurities takes place) a test is made of the soluble alkalinity and the required amount of lime or equivalent alkali is added to bring the soluble alkalinity of the juice to the optimum necessary for filtration. The optimum value varies with the particular juice and the conditions of operation. The amount of added lime may in the case of raw beet juices be such as to give a soluble alkalinity value of 0.08 to 0.13% lime on the weight of the juice.

After the juices have been brought to their optimum soluble alkalinity the flocculated impurities are separated by any one of the well known methods e. g. filtration, decantation or centrifuging or by any other adequate process of separation. The juices are then brought to the alkalinity which is the optimum for further clarification and concentration, by the addition of acid. This acid may conveniently comprise carbon dioxide or sulphur dioxide or phosphoric acid and in the first mentioned case may be derived from the boiler flue gases. The juices are then filtered again and the scums may advantageously be added to further juice from which flocculated impurities have not been separated.

It will be understood that the juices may be heated as desired between successive steps in the process according to the arrangements in any particular factory and according to the composition of the beets or cane undergoing treatment. As stated above the temperature will in general lie between 80° and 95° C. for the treatment of raw beet juices. The two adjustments viz. of the pH value of the juice and the soluble alkalinity may, as stated above, be made by a single addition of lime or equivalent alkali and this form of the invention comprises the step of adding to sugar juice an amount of lime or equivalent alkali in excess of the minimum amount necessary to bring the juice to the optimum isoelectric point (as hereinbefore defined) of the colloidal impurities to be flocculated, such excess amount of lime or equivalent alkali being insufficient to alter the pH of the juice to such an extent as to affect the state of aggregation or flocculation of the colloidal impurities (as for example by reversal of the sign of the electrical charge carried by the unflocculated colloidal impurities) but sufficient to confer on the juice that soluble alkalinity at which removal of the flocculated colloidal impurities by filtration or like processes takes place readily.

When the sugar juice treated is beet sugar juice the amount of lime added is preferably such that the pH is brought to the optimum isoelectric point in the alkaline region of the colloids to be flocculated viz., to 10.6 to 12.0. Flocculation may ultimately be completed by the rapid introduction into the alkalized juice of liquid sulphur dioxide or of sulphur dioxide or carbon dioxide gas under relatively high pressure. Alternatively any of the electrolytically equivalent substances described above may be employed.

A further object of the invention is to provide a convenient process for decalcifying the sugar juice after it has been treated as above described and has been subjected to the steps of filtration and (if desired) of clarification.

The term decalcification is used to connote the removal of residual lime (i. e. dissolved lime) or other alkaline substance which has been added to the juice for the purpose of bringing its pH to the value required for removal of the colloidal impurities and which unless removed would cause difficulty in the subsequent treatment of the juices by processes of decolorization, clarification, concentration and crystallization. This process of decalcification comprises the addition to the sugar juice of a substance which will by a process of double decomposition replace the acid radicle of soluble calcium salts present in the juice with the formation upon subsequent heating of an insoluble calcium product and at the same time of a soluble non-toxic substance which will not interfere with the subsequent purification of the sugar juice e. g. by formation of a precipitate in the processes of concentration or crystallization.

Such a decalcifying agent may consist of sodium carbonate, a soluble phosphate or phosphoric acid which will react with calcium sulphite or other soluble calcium salt present in the sugar juices and form by double decomposition a precipitate of calcium carbonate or phosphate and an innocuous solution of a sulphite which does not interfere with the subsequent processes of concentration and crystallization but passes into the molasses. The precipitate of calcium carbonate or phosphate may be removed by any convenient means.

Following are descriptions by way of example of three methods of carrying the present invention into effect.

*Example I*

The beet sugar juices to be purified are treated hot (say 85° C.) successively with lime and liquid sulphur dioxide so as to bring them to the optimum isoelectric point of the colloidal impurities present and to bring about the irreversible flocculation of these colloidal impurities, the precise amounts of alkali and liquid sulphur dioxide being determined by a simple series of preliminary tests carried out in the laboratory with some raw juice obtained from beets sensibly the same as are to be used in the factory.

Five series of experiments each comprising four or five samples each of half a litre are prepared. The first series is alkalized to 0.10% CaO (phenolphthalein as indicator) and the various samples treated with increasing amounts of $SO_2$ in the form of an aqueous solution of about 4% strength, measured accurately from a burette.

The second series is alkalized to 0.15% CaO and the various samples are treated with the same amounts of $SO_2$ as the corresponding samples in the preceding series.

The third series is alkalized to 0.20% CaO and the various samples are treated with the same amounts of $SO_2$ as the corresponding samples in the two preceding series.

The fourth and fifth series are similarly carried out with juice alkalized to 0.25% and 0.3% CaO respectively. All the samples are heated together to the same temperature under the same conditions.

In all the samples there will be a flocculation. The time of settling should be noted and those samples chosen where the settling is most rapid and the supernatant liquor most brilliant.

The number of series and the range of the same may be altered as desired.

After thorough mixing, portions of these chosen samples are heated to 85° to 90° C. and then tested for soluble alkalinity. Further very small additions of lime are made to aliquot portions of the remainder of the selected sample. Thus, in the series of tests described above, the third series i. e. that in which the raw juices were alkalized to 0.2% CaO were found to give the best results and of these the particular sample which had been treated with 0.1 grm. of liquid $SO_2$ per litre of juice was found to be the best of the series. This particular sample was heated to 85° to 90° C. and a portion thereof filtered. The alkalinity of the filtrate was found to be 0.09%. The remainder of this particular sample was divided into a number of aliquot portions and to each was added a small quantity of CaO, the amounts ranging from 0.02 to 0.05% CaO on beet. These sub-samples were re-heated and filtered under identical conditions. It was found on determining the alkalinity of each of the filtrates that this ranged from 0.11 to 0.14 and of these tests it was found that the sample which had been treated with an additional amount of 0.04% CaO and which gave a soluble alkalinity of 0.13% CaO filtered most rapidly. The apparent purity of each of these filtrates is determined by the well-known laboratory methods and the sample which shows the greatest rise in apparent purity over that of the untreated juice is taken as that indicating the optimum amount of lime and sulphur dioxide for the flocculation of the colloidal impurities. Lime and sulphur dioxide in these proportions are added to the main bulk of the juice to be purified. Subsequently a small addition of lime is made in order to bring the soluble alkalinity up to the value which as described above was found to be the optimum for filtration. The treated juices are then heated to 85° to 90° C. and are filtered. After filtering, the juices are treated with carbon dioxide so as to bring the soluble alkalinity of the liquid to its optimum value (equivalent to 0.01 to 0.02% lime) before concentration and are again filtered. The scums coming from this clarification are returned to the system and are mixed with juices upon which the first filtration has not yet been carried out. Finally the juices are concentrated and purification completed by known processes.

*Example II*

Beet sugar juices in which the colloidal impurities are completely flocculable by lime alone are treated with an amount of lime determined by a simple series of tests similar to those described in Example I. The optimum soluble alkalinity of the juice is determined as already described and a suitable amount of lime is added so as to bring the soluble alkalinity of the liquid up to the value which, as described above, was found to be the optimum for filtration. The juices are heated and filtered as in the preceding example and the juices treated with sulphur dioxide, filtered and concentrated.

*Example III*

Beet sugar juice is treated with lime and $SO_2$ in such regulated amounts as to effect the flocculation of colloidal impurities present in the juice and also to bring the juice into such a state that the flocculated impurities are readily removable by filtration or similar process. The amounts of lime and $SO_2$ are ascertained by carrying out a series of tests as follows:—

Five series of tests each comprising four or five half-litre samples are alkalized with CaO and treated with increasing amounts of $SO_2$ in the form of a 4% aqueous solution as in Example I.

After the samples in which the time of settling is most rapid and the supernatant liquid most brilliant have been noted a series of sugar juice samples is prepared to each of which is added that amount of sulphur dioxide shown by the preceding tests to bring about the most rapid sedimentation with the most brilliant supernatant liquid, (when the $SO_2$ treatment follows the lime treatment, as described), and to the samples are added increasing amounts of alkali e. g. lime. The whole series of samples is heated and the time taken for a definite volume of the liquid to filter noted in each case. The amounts of sulphur dioxide and lime added in this particular test show the amounts of this reagent necessary to secure the most complete flocculation of colloidal impurities and the best conditions for their removal.

I claim:—

1. A process for the purification of sugar juices in the alkaline range which comprises adding alkali, and, if required for the flocculation of the colloids, an acid electrolyte in regulated and predetermined amounts sufficient to bring the juice to the optimum isoelectric point of the colloidal constituents of the juice and adjusting the soluble alkalinity of the juice, without substantial variation of the pH value thereof, to bring the soluble alkalinity to a value which is an optimum for the removal of the flocs from the liquid, heating the juice to flocculating temperature and separating out the flocculated impurities.

2. A process for the purification of sugar juice in the alkaline range which comprises adding alkali, and, if required for the flocculation of the colloids an acid electrolyte, in amounts determined by test, to bring the juice to the optimum isoelectric point of the colloidal constituents of the juice corresponding to a pH in the alkaline range and the soluble alkalinity to a value, determined by test, which is an optimum for the subsequent removal of the flocs from the liquid, without substantial variation of the pH value thereof, heating the juice to flocculating temperature, separating off the flocculated impurities and treating the juice with carbon-dioxide to bring its alkalinity to the optimum value for clarification and concentration.

3. A process for the purification of sugar beet juices in the alkaline range which comprises adding alkali, and, if required for the flocculation of the colloids, an acid electrolyte in predetermined amounts sufficient to bring the juice to the optimum isoelectric point of the colloidal constituents of the juice in the pH range of approximately 10.6 to 12 and adjusting the soluble alkalinity of the juice to a value of from 0.08 to 0.13% of lime on the weight of the juice which is an optimum for the subsequent removal of the flocs from the liquid, heating the juice to flocculating temperature and separating out the flocculated impurities.

4. A process for the purification of sugar beet juices in the alkaline range which comprises adding alkali in regulated and predetermined amounts to raise the pH value of the juice substantially to the optimum isoelectric point of the colloidal constituents of the juice, corresponding to a pH of approximately 10.6 to 12, and the soluble alkalinity to from 0.08 to 0.13% of lime on the weight of the juice, heating the juice to flocculating temperature and filtering off the flocculated impurities.

5. A process for the purification of sugar juice in the alkaline range which comprises adding alkali in regulated and predetermined amounts sufficient to bring the juice to the optimum isoelectric point of the colloidal constituents of the juice, adjusting the soluble alkalinity of the juice by the addition of alkali without substantial variation of the pH value thereof, to bring the soluble alkalinity to a value which is an optimum for the subsequent removal of the flocs from the liquid, heating the juice to flocculating temperature, separating off the flocculated impurities and treating the juice with acid to reduce the alkalinity thereof to factory requirements.

6. A process for the purification of sugar juice which comprises adding alkali and acid electrolytes in amounts predetermined by test to bring the juice to the optimum isoelectric point in the alkaline range and adding an amount of alkali in excess of the minimum necessary to bring the juice to the optimum isoelectric point and insufficient to alter the pH of the juice to such an extent as to affect the state of aggregation of the colloidal impurities but sufficient to confer on the juice the soluble alkalinity which is an optimum for the removal of flocculated colloids, heating the mixture to the flocculating temperature, filtering and thereafter adding acid electrolyte to reduce the alkalinity of the juice to factory requirements.

7. A process for the purification of sugar juice in the alkaline range which comprises adding alkali in regulated and predetermined amounts sufficient to bring the juice to the optimum isoelectric point of the colloidal constituents of the juice, adjusting the soluble alkalinity of the juice by the addition of alkali without substantial variation of the pH value thereof, to bring the soluble alkalinity to a value which is an optimum for the subsequent removal of the flocs from the liquid, heating the juice to flocculating temperature and separating off the flocculated impurities.

8. A process for the purification of sugar juice in the alkaline range which comprises adding alkali, and, if required for the flocculation of the colloids an acid electrolyte, in amounts determined by test, to bring the juice to the optimum isoelectric point of the colloidal constituents of the juice corresponding to a pH value, determined by test, which is an optimum for the subsequent removal of the flocs from the liquid, without substantial variation of the pH value thereof, heating the juice to flocculating temperature, separating off the flocculated impurities and treating the juice with acid to bring its alkalinity to the optimum value for clarification and concentration.

DARIO TEATINI.